F. R. WHITTON AND W. OSTER.
WORM HOIST FOR DUMP TRUCKS.
APPLICATION FILED JULY 12, 1919.
1,359,776.
Patented Nov. 23, 1920.
2 SHEETS—SHEET 1.
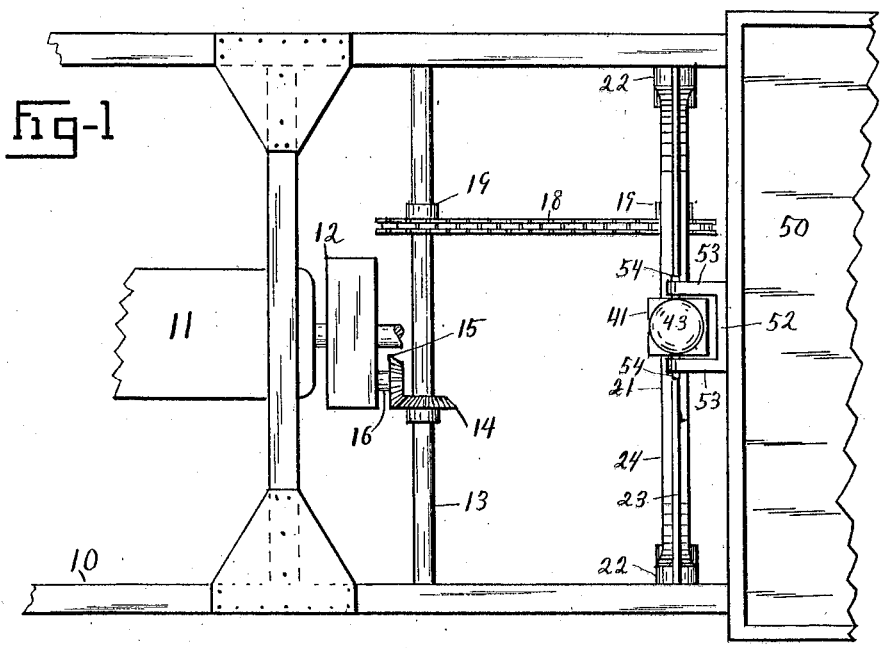
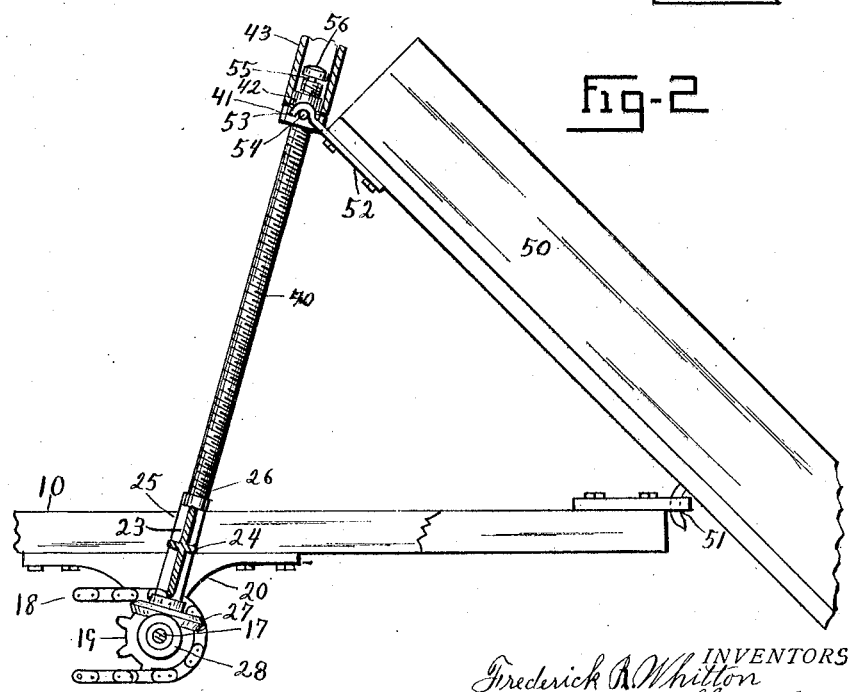
INVENTORS.
Frederick R. Whitton
and William Oster,
BY
W.B. Munnell.
ATTORNEY

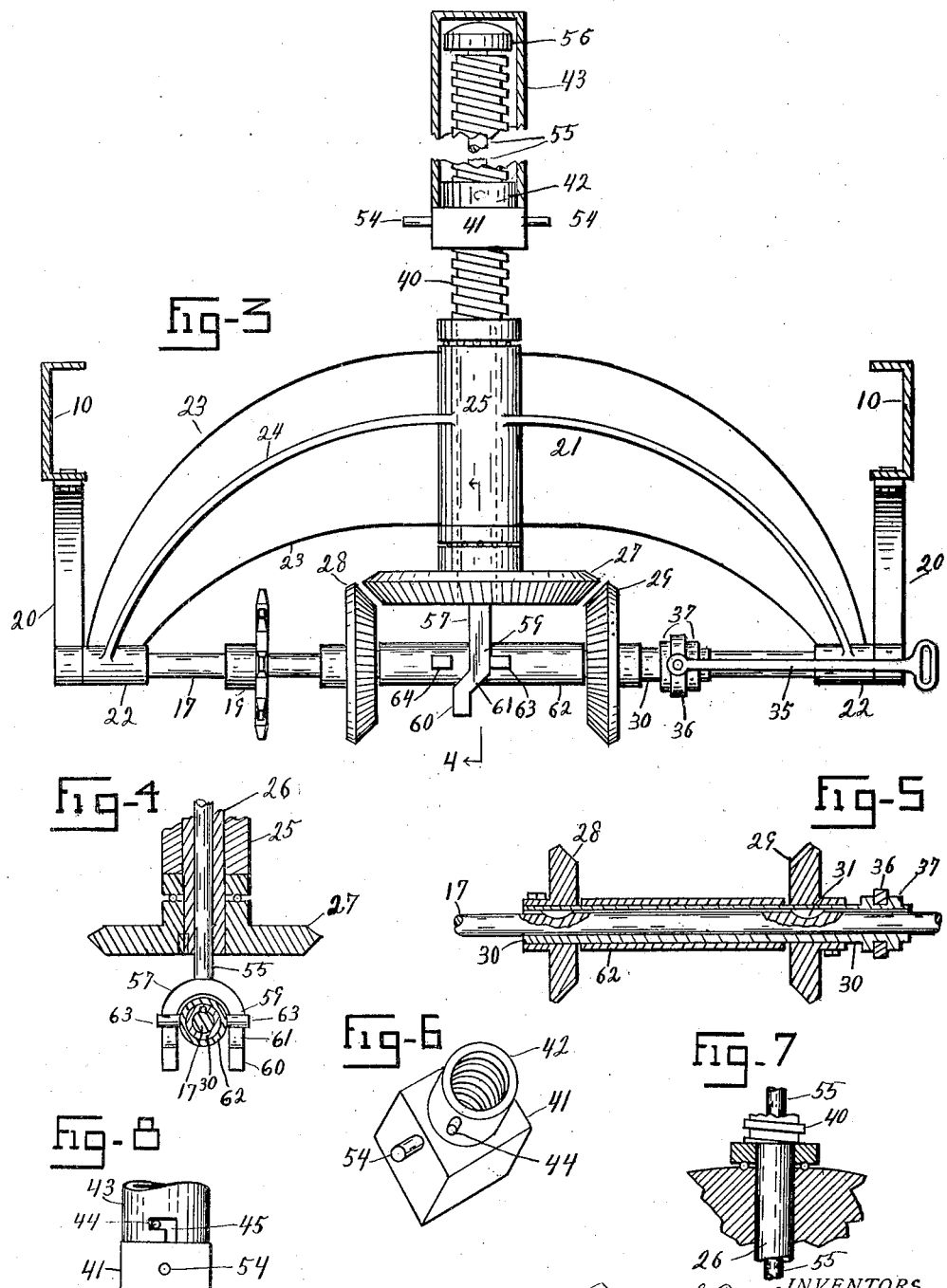

UNITED STATES PATENT OFFICE.

FREDERICK R. WHITTON AND WILLIAM OSTER, OF NEW ALBANY, INDIANA.

WORM-HOIST FOR DUMP-TRUCKS.

1,359,776.  Specification of Letters Patent.  Patented Nov. 23, 1920.

Application filed July 12, 1919. Serial No. 310,401.

*To all whom it may concern:*

Be it known that we, FREDERICK R. WHITTON and WILLIAM OSTER, citizens of the United States, and residing at New Albany, county of Floyd, and State of Indiana, have invented a new and useful Worm-Hoist for Dump - Trucks, of which the following is a specification.

This invention relates to means for raising the front end of the body of a motor truck, the body being hinged to the rear end of the chassis, in order to dump the contents.

An object of this invention is to provide means of the character described, which will be positive in action, efficient in operation and durable in service.

With the foregoing and other objects in view, the invention consists of the novel construction and arrangement of parts illustrated in the annexed drawings, which form a part of this specification, wherein is set forth an embodiment of the invention, but it is to be understood that such changes and modifications may be resorted to as come within the scope of the claims appended hereunto.

In the drawings wherein similar reference characters designate like parts in the several views, Figure 1, is a top plan view of a portion of the chassis of a motor truck, showing an embodiment of the invention applied thereto; Fig. 2, a side elevation with parts broken away and parts in section, showing the front end of the truck body raised into dumping position; Fig. 3, a front elevation (on an enlarged scale) of the device in position; Fig. 4, a section on line 4 of Fig. 3; Fig. 5, a longitudinal section of the central portion of the shaft upon which the hoist is mounted; Fig. 6, a perspective view of the nut; Fig. 7 is a section through a certain ball bearing used in connection with this invention, and Fig. 8, a detached detail.

Referring now to the drawing, a chassis is indicated by the reference character —10—, the motor by —11— and the transmission gear box by —12—, these may be of conventional, or of any suitable type. A shaft —13— mounted transversely in the chassis is adapted to be driven by the motor, connection with which may be made by any suitable means. As illustrated such means comprise a bevel gear —14— on the shaft 13, and a coacting gear —15— on the shaft —16— which is extended from the transmission box. A second shaft —17— is mounted in the rear of and parallel with the first shaft and is driven therefrom, any suitable means being employed, such as a sprocket chain —18— which leads over sprocket wheels —19—. The shaft 17 is journaled in brackets —20— which depend from the chassis. A yoke —21— is pivotally mounted on the shaft 17 by means of bearings —22— which lie close to the brackets 20, this yoke comprises vertical webs —23— and horizontal webs —24—. These webs spring from bearings 22, and serve to support a bearing —25— centrally over the shaft 17, and at right angles thereto. The bearing 25 is of great length and receives the lower end of a shaft —26—. Suitable means such as a bevel gear —27— is secured to the lower end of the shaft 26, where it protrudes below the bearing 25, for the purpose of imparting rotary movement to the shaft 26. A pair of bevel gears —28— —29—, are secured upon a sleeve —30— which is slidably mounted upon the shaft 17, and is connected therewith by suitable means such as Woodruff keys —31—. The driving gears 28, 29 are spaced such a distance apart that when disposed on each side of the driven gear 27 neither of them is normally in contact therewith, but by sliding the sleeve one way or the other, either may be engaged therewith, thereby enabling the shaft 26 to be rotated in either direction by the shaft 17, which itself rotates in but one direction. Any suitable means may be employed to shift the gears 28, 29 such as a bar —35— which is connected to a ring —36— loosely mounted upon the sleeve between two collars —37— whereby the sleeve may turn without affecting the ring. The upper part of the shaft 26 is provided with a spiral thread, or worm —40—. A nut —41— is positioned on the worm and is adapted to travel up or down thereon accordingly as the shaft is rotated. The body of the nut is preferably square and bears a vertical cylindrical extension —42— which is adapted for the affixation thereto of a casing, or cover —43—, which normally incloses and protects the worm throughout to substantially its entire length. The cover may be secured upon the nut in any suitable manner. The means illustrated comprises a pin —44—, extended from the nut, and a bayonet slot —45— in the lower end of the cover. A truck body —50—, hinged at —51— to the rear end of the chassis, is provided centrally of its forward end, with a bifurcated plate —52—, the bifurcations —53—, of which extend beyond the end and are adapted to embrace the nut 41, and rest upon trunnions —54— which extend from the sides thereof. When it is desired to raise the front end of the truck body, the bar 35, is drawn out, thereby bringing the driving gear 28 into operative association with the driven gear 27, the worm will then be rotated, driving the nut upward thereon, and raising the forward end of the truck body. The constant change of inclination of the worm shaft, due to the fact of the end of the truck body moving upward through an arc of a circle, is accommodated for by means of its pivotal relation to the shaft 17, and to the bifurcated plate 52. When the body has reached the desired inclination, the gears may be disengaged. When the body is to be lowered, the bar 35 is pushed inward thereby engaging the driving gear 29, with the driven gear 27 and rotating the worm in a reverse direction. The gears are disengaged by manual manipulation when the body reaches its normal position of rest. Failure to disengage at the proper moment will result in damage to the structure, and to avoid this, automatic means are provided to disengage the gears at the completion of the upward and downward movement and to prevent other than a proper engagement of the gears. A rod —55— extends through the shaft 26, projecting from each end thereof, on its upper end it is provided with a knob, or head —56— which is larger in diameter than the worm, whereby it lies in the path of and is engaged and raised by the upper end 42, of the nut as it reaches the upper limit of its travel. On the lower end of the rod, is a bifurcated member —57—, the bifurcations of which each comprises a main or body portion —59—, which lies in the same plane as the rod, and an offset part —60— which lies in a plane parallel with the body, and is connected therewith by an inclined part —61—. The bifurcations lie respectively on each side of a sleeve —62— and between projections —63, 64— on the sides thereof. The sleeve, 62, is positioned on the sleeve 30, between the driving gears 28, 19. Normally the projections 63, lie against the body part of the bifurcations, and the gears can be shifted in but one direction i. e. to bring the driving gear 28 into operative association with the driven gear. As the nut reaches the upper limit of its travel the end thereof will engage the head 56 on the rod 55, and raise it and the bifurcated member, causing the inclined part 61, to act upon the projection 64, thereby sliding the gears over and disengaging the driving gear 28 from the driven gear. The offset part 60, has now moved into the path of the projection 64, thereby preventing the reëngagement of said gears. The only engagement of gears now possible, is that of the driving gear 29, with the driven gear, which is accomplished by pushing the bar 35 inward, this causes a reverse rotation of the worm and consequent lowering of the body. As the nut approaches the lower limit of its travel the end of the cover 43, will contact with the head of the rod 55, thereby pushing it downward and causing the incline 61 to act upon the projection 63 and thereby disengage the gears leaving the mechanism in its normal state of rest.

Having thus described our invention so that anyone skilled in the art pertaining thereto can make and use the same,

We claim:

1. In a dump truck, a chassis, a shaft journaled therein, a yoke pivotally mounted on said shaft, a bearing supported by said yoke, a worm shaft journaled in said bearing, a nut positioned on and adapted to travel along said worm, a cover for said worm attached to and adapted to travel with said nut, a driven gear on the lower end of the worm shaft, a pair of driving gears slidably positioned on the first named shaft and adapted to be engaged respectively with opposite sides of the driven gear, means adapted to be actuated by said nut at the upper limit of its travel to disengage one of said gears, and means adapted to be actuated by the cover as it approaches the lower limit of its travel to disengage the other gear.

2. In a dump truck, a chassis, a body hinged to one end thereof, a worm pivotally connected with said chassis, a nut mounted on said worm and adapted to travel thereon, a pivotal connection between said nut and the free end of said body, a gear fixed to said worm to rotate the same, a driving shaft adjacent said gear, a sleeve movably longitudinally of the driving shaft and rotatable therewith, gears mounted on said sleeve for selective engagement of the first mentioned gear at opposite sides thereof, projections extending laterally from said sleeve and a cam member movable between said projections and engageable by the nut at the limit of its upward travel, and a cover for said worm attached to and traveling with said nut, said cover being arranged to engage the cam member at the lower limit of the travel of said nut.

F. R. WHITTON.
WM. OSTER.